US012604058B2

(12) United States Patent
Sheehan et al.

(10) Patent No.: US 12,604,058 B2
(45) Date of Patent: Apr. 14, 2026

(54) SYSTEM FOR MULTICAST TRANSMISSION OF TARGETED ASSETS

(71) Applicant: INVIDI Technologies Corporation, Princeton, NJ (US)

(72) Inventors: Patrick M. Sheehan, Jamison, PA (US); Alden Lloyd Peterson, II, New Providence, NJ (US); Daniel C. Wilson, Edmonton (CA)

(73) Assignee: INVIDI TECHNOLOGIES CORPORATION, Princeton, NJ (US)

( * ) Notice: Subject to any disclaimer, the term of this patent is extended or adjusted under 35 U.S.C. 154(b) by 0 days.

(21) Appl. No.: 16/592,497

(22) Filed: Oct. 3, 2019

(65) Prior Publication Data

US 2021/0289260 A1 Sep. 16, 2021

Related U.S. Application Data

(60) Provisional application No. 62/742,118, filed on Oct. 5, 2018.

(51) Int. Cl.
| | |
|---|---|
| *H04N 21/458* | (2011.01) |
| *H04N 21/262* | (2011.01) |
| *H04N 21/43* | (2011.01) |
| *H04N 21/462* | (2011.01) |

(52) U.S. Cl.
CPC ......... *H04N 21/458* (2013.01); *H04N 21/262* (2013.01); *H04N 21/43079* (2020.08); *H04N 21/462* (2013.01)

(58) Field of Classification Search
CPC .......... H04N 21/458; H04N 21/43079; H04N 21/262; H04N 21/462; H04N 21/252; H04N 21/6125; H04N 21/2668; H04N 21/6405; H04N 21/812
USPC .......................................................... 725/34
See application file for complete search history.

(56) References Cited

U.S. PATENT DOCUMENTS

| | | | |
|---|---|---|---|
| 7,730,509 B2 | 6/2010 | Boulet et al. | |
| 8,060,904 B1 * | 11/2011 | Evans .............. H04N 21/23424 | |
| | | | 725/132 |
| 8,549,558 B2 * | 10/2013 | Riedl ............... H04N 21/26208 | |
| | | | 725/35 |

(Continued)

FOREIGN PATENT DOCUMENTS

KR 1020140023627 A 2/2014

OTHER PUBLICATIONS

International Search Report and Written Opinion issued in International Application No. PCT/US2019/054550 mailed Jan. 29, 2020, 10 pp.

(Continued)

*Primary Examiner* — Sahar Aqil Riaz
(74) *Attorney, Agent, or Firm* — Davis Graham & Stubbs LLP

(57) ABSTRACT

Asset options are multiplexed into a multicast stream. In one implementation, a single stream (300) includes programming (306) and assets (302). A user equipment device delivers one of the assets (302) for delivery in connection with an asset delivery opportunity. The stream (300) also includes metadata (304) to assist the user equipment device in selecting the asset for delivery. Targeted advertising can thus be implemented in shared stream environments while efficiently using available bandwidth.

11 Claims, 7 Drawing Sheets

(56)                     References Cited

U.S. PATENT DOCUMENTS

| | | | | | |
|---|---|---|---|---|---|
| 8,660,545 | B1* | 2/2014 | Redford | .................. | H04W 4/50 |
| | | | | | 455/418 |
| 8,776,115 | B2* | 7/2014 | Sheehan | ............ | H04N 21/4302 |
| | | | | | 725/35 |
| 8,937,948 | B2* | 1/2015 | Zampiello | ........... | H04L 12/1859 |
| | | | | | 370/390 |
| 9,407,940 | B1* | 8/2016 | Bertz | ................. | H04N 21/4532 |
| 9,560,404 | B2* | 1/2017 | Phillips | .............. | H04N 21/6405 |
| 9,693,086 | B2 | 6/2017 | Kouritzin et al. | | |
| 9,712,788 | B2 | 7/2017 | Downey et al. | | |
| 9,877,057 | B2* | 1/2018 | Grant | ............... | H04N 21/25841 |
| 9,883,208 | B2* | 1/2018 | Rippe | .................... | H04N 21/20 |
| 10,735,795 | B2 | 8/2020 | Wilson et al. | | |
| 11,284,166 | B1* | 3/2022 | Sheehan | ............ | H04N 21/2668 |
| 2007/0204292 | A1* | 8/2007 | Riedl | .................... | H04N 21/252 |
| | | | | | 348/E7.071 |
| 2008/0198848 | A1* | 8/2008 | Yamagishi | ......... | H04N 21/4384 |
| | | | | | 375/E7.025 |
| 2009/0037948 | A1* | 2/2009 | Hostyn | ................ | H04N 21/458 |
| | | | | | 725/32 |
| 2010/0088426 | A1* | 4/2010 | Takemura | .......... | H04N 21/6125 |
| | | | | | 709/231 |
| 2011/0166940 | A1* | 7/2011 | Bangera | .................. | G01S 7/412 |
| | | | | | 705/14.66 |
| 2012/0023131 | A1* | 1/2012 | Downey | .............. | H04N 21/812 |
| | | | | | 707/769 |
| 2012/0272147 | A1* | 10/2012 | Strober | .............. | H04N 21/6587 |
| | | | | | 715/716 |
| 2012/0272148 | A1* | 10/2012 | Strober | .............. | H04N 21/6543 |
| | | | | | 715/716 |
| 2013/0003993 | A1* | 1/2013 | Michalski | .......... | G06F 3/04842 |
| | | | | | 381/119 |
| 2013/0097628 | A1* | 4/2013 | Yu | ...................... | H04N 21/2668 |
| | | | | | 725/27 |
| 2014/0020037 | A1* | 1/2014 | Hybertson | ......... | H04N 21/2365 |
| | | | | | 725/109 |
| 2014/0207840 | A1* | 7/2014 | Smith | ................... | A63F 13/828 |
| | | | | | 709/201 |
| 2016/0127801 | A1 | 5/2016 | Baldwin | | |
| 2016/0156945 | A1* | 6/2016 | Romrell | ............ | H04N 21/8586 |
| | | | | | 725/36 |
| 2016/0219311 | A1* | 7/2016 | Yamagishi | ............ | H04L 65/611 |
| 2017/0238068 | A1 | 8/2017 | Sellers et al. | | |
| 2017/0272983 | A1* | 9/2017 | Oyman | .................. | H04N 7/147 |
| 2019/0034060 | A1* | 1/2019 | Ahmad | ............... | G06F 3/04842 |
| 2019/0379551 | A1* | 12/2019 | Prasad | ............... | H04W 72/005 |
| 2020/0037035 | A1* | 1/2020 | Kaufman | .......... | H04N 21/2402 |
| 2024/0040193 | A1* | 2/2024 | Loheide | ................. | H04L 65/60 |

OTHER PUBLICATIONS

International Preliminary Report on Patentability issued in International Application No. PCT/US2019/054550 mailed Mar. 23, 2021, 6 pp.

* cited by examiner

FIG. 7

SYSTEM FOR MULTICAST TRANSMISSION OF TARGETED ASSETS

CROSS-REFERENCE TO RELATED APPLICATION

This application is a non-provisional of U.S. Provisional Application No. 62/742,118, entitled, "SYSTEM FOR MULTICAST TRANSMISSION OF TARGETED ASSETS," filed on Oct. 5, 2018. The contents of the above-noted application are incorporated by reference herein as if set forth in full and priority to this application is claimed to the full extent allowable under U.S. law and regulations.

FIELD OF THE INVENTION

The present invention relates generally to delivery of targeted or addressable assets, e.g., advertisements, to users of a communications network and, in particular, to a system for multicast transmission of targeted assets.

BACKGROUND OF THE INVENTION

Advertisements delivered during shared stream programming, e.g., broadcast or multicast programming, remain a primary focus of the advertising industry. Unlike other online ads, e.g., frame ads, pop-up ads, etc., ads in shared stream programming capture the full attention of audience members with full motion video content for maximum engagement and effectiveness. Unlike unicast streaming, shared stream ads can reach large audiences with efficient use of bandwidth. Thus, despite the emergence of alternate modes of content delivery, advertising in shared stream programming remains a desirable tool for many advertisers.

The value of advertising in shared stream programming has additionally been enhanced by the emergence of advanced targeting technologies. In the case of broadcast network environments, these technologies enable advertisements to be selected for individual devices, individual households, or even individual users, based on matching the targeting criteria for the advertisement to classification parameters associated with the device, household or user. In this manner, different audience members of a given shared stream programming event can receive different assets, e.g., assets custom selected for those audience members. Targeted assets have been shown to be more effective and command a greater distribution price, typically measured in cost per thousand impressions or CPM.

A number of provisioning mechanisms have been developed for broadcast environments such as cable or satellite television. These include channel hopping, forward and store, and IP delivery. In channel hopping, a number of asset options are provided on separate asset channels synchronized with an asset delivery opportunity such as an addressable ad spot of a given commercial break on a given programming channel. When the addressable spot occurs, the user equipment device is controlled, in a manner that is invisible to the user, to switch to the asset channel that carries the asset selected for that device or user. At the conclusion of the addressable spot, the device is controlled to switch back to the programming channel or to another asset channel in the case of successive addressable spots.

The forward and store mechanism involves transmitting assets to the device in advance of an addressable spot. For example, available bandwidth may be identified for broadcasting assets to user equipment devices, e.g., overnight or otherwise as bandwidth is opportunistically available. An individual device can then identify and store assets that may be needed by that device, e.g., based on classification parameters of that device or expected users of that device. When an asset delivery opportunity occurs, an appropriate asset can then be retrieved from storage and inserted into the delivered stream.

In the prior examples of provisioning mechanisms, assets are provided using the broadcast network. An alternative is to provision the assets via a different network or transport mechanism than the programming content. For example, in broadcast networks, the assets may be provided via an IP network. The assets may be transmitted to the user equipment device at the time of the asset delivery opportunity or may be provided ahead of time and stored at the device as in the forward and store mechanism. In either case, the assets are generally unicast to specific devices as needed. These mechanisms have proved highly effective to support targeted advertising in broadcast contexts.

However, the ability to target assets in multicast programming has been limited by practical considerations. Due to the nature of multicast networks, broadcast transmission of assets to support channel hopping or forward and store mechanisms is generally not available. IP mechanisms for unicast delivery of assets is possible but greatly undermines a fundamental advantage of multicast programming. That is, one important reason for providing multicast programming is that the bandwidth required to send a multicast program is limited to a single IP stream regardless of the number of audience members. If individual IP streams are then required to support targeted asset transmission, bandwidth requirements are greatly increased, and the bandwidth advantage is undermined. As a result, the use of targeted advertising in multicast programming has been limited.

SUMMARY OF INVENTION

The present invention is directed to a method and system for multiplexing asset options into a multicast stream. The invention can be used to support targeted asset delivery in shared stream programming including multicast programming. In this manner, targeted asset delivery can be provided in multicast programming without undermining the bandwidth advantages of multicast programming. Moreover, targeted asset delivery can be more fully deployed in connection with such programming, thereby promoting the deployment of multicast programming and potentially enhancing revenues.

In accordance with one aspect of the present invention, a data network platform is operative for delivering targeted assets in a shared stream network environment. The associated method involves operating a network structure of one or more network platforms to establish a first shared stream, such as a broadcast or multicast stream, where multiple end user devices can simultaneously receive the stream. Programming content having a first asset delivery opportunity is inserted into the stream. In addition, a set of two or more assets is inserted into a second, multicast stream that may be the same as or different than the first stream. For example, the assets may be targeted asset options for delivery in the first asset delivery opportunity. The second stream may also include metadata for use by the end user devices in selecting one of the assets for delivery. Depending on the specific implementation, the metadata may include instructions concerning which asset to deliver, targeting parameters for the assets, or other information that directs or assists the selections by the end user devices. The selection may be based on a comparison of asset targeting parameters to audience classification parameters made at the device or another network platform. In this manner, targeted asset delivery in a shared stream environment can be supported by multicast assets.

The two or more assets are associated with the time window of the asset delivery opportunity, e.g., by synchronous transmission, near synchronous transmission (e.g., the assets may be delivered slightly ahead of time and buffered to allow time for transitions to deliver a desired asset, such as where the assets are not included in the same multiplex as the programming content and synchronizing the streams may be difficult), time stamps, or other identification of the asset delivery opportunity or time window. In one implementation, the programming content is inserted into a multicast stream and the assets are multiplexed into the same multicast stream. Among other things, this allows for efficient use of bandwidth to support targeted asset delivery in multicast network environments and reduces or substantially eliminates timing issues that could result from transmitting the assets in a separate multicast stream. The number of assets to be included, as well as which assets, may be determined based on an expected size and composition of the audience for the programming content and other factors such as available bandwidth, expected revenues, and contract constraints. For example, the expected audience composition may be based, at least in part, on messaging between user equipment devices and the data network, e.g., from at least some user equipment devices regarding at least some of the assets. In addition, at least some of the devices may report what assets were delivered (or partially delivered) in connection with the asset delivery opportunity. Such reports can be used to bill asset providers, measure the audience, and/or analyze asset effectiveness.

An associated apparatus or system may include a programming module, an asset selection module, an asset accessing module, and an output module for providing functionality as described above. Specifically, the programming module is associated with the network structure for accessing the programming content including the asset delivery opportunity. The asset selection module selects the assets for transmission to the end user devices, e.g., based on bandwidth limitations, expected audience composition and other factors. The asset accessing module is associated with the network structure for accessing the assets from a repository of assets. The output module outputs at least one multicast stream including the programming content and the assets. For example, the assets may be multiplexed into the same multicast stream that includes the programming content.

In accordance with another aspect of the invention, an end-user device is operative for delivering targeted assets in a shared stream network environment. The associated methodology involves operating an end-user device to access a first shared stream including programming content having a first asset delivery opportunity associated with a time window of the programming content. The end-user device further accesses a second multicast stream, the same as or different from the first shared stream. The second stream includes an asset set of at least two assets available for delivery in the first asset delivery opportunity together with asset metadata for use in selecting one of the assets for delivery. The method further involves operating the end-user device to select one of the assets for delivery in the first asset delivery opportunity such that the end-user device receives targeted assets via multicast in connection with shared stream programming.

The end user device may execute additional functionality. For example, the device may message the network platform to provide an indication of user classification parameters or asset appropriations. In one implementation, the device may receive a list of potential assets for an upcoming asset delivery opportunity and submit one or more votes for or against one or more of the assets, e.g., based on a comparison of targeting parameters for the asset to user classification parameters. Such votes, in combination with votes from other devices, can be used to optimize the asset options provided in connection with the asset delivery opportunity. The device may also monitor asset delivery, e.g., to determine what asset was delivered, whether it was delivered/consumed in full, and whether a user was actively engaged. Some or all of this information may be reported to the network platform.

An associated apparatus or system may include an input port, a processor, a decoder, and an output module. The input port is associated with the end-user device for receiving the first shared stream including the first programming content having the first asset delivery opportunity and for receiving the second multicast stream including the asset set together with the asset metadata. The processor is operative for selecting one of the assets for delivery in the first asset delivery opportunity. The decoder decodes at least the first shared stream and the selected asset. The output module is operative for delivering via the end-user device the programming content and the first asset in the first asset delivery opportunity. Appropriate modules may be provided for voting and reporting.

BRIEF DESCRIPTION OF THE DRAWINGS

For a more complete understanding of the present invention and further advantages thereof, reference is now made to the following detailed description, taken in conjunction with the drawings, in which:

FIG. 7 is a flowchart showing user equipment device functionality in accordance with the present invention.

DETAILED DESCRIPTION

In the following description, the invention is set forth in the context of various streaming networks that provide a multicast stream including multiple asset options for delivery during an asset delivery opportunity, such as a commercial break, of a streamed program. It will be appreciated that the invention is not limited to this context. For example, multicast streams may be used to deliver asset options in connection with other types of content. Moreover, the asset delivery opportunities are not limited to commercial breaks but may encompass product placement opportunities, overlay opportunities and other kinds of asset delivery opportunities. Many other alternative implementations of the invention are possible and will be understood upon consideration of the description below. Accordingly, the following description should be understood as exemplary and not by way of limitation.

Figure 1:
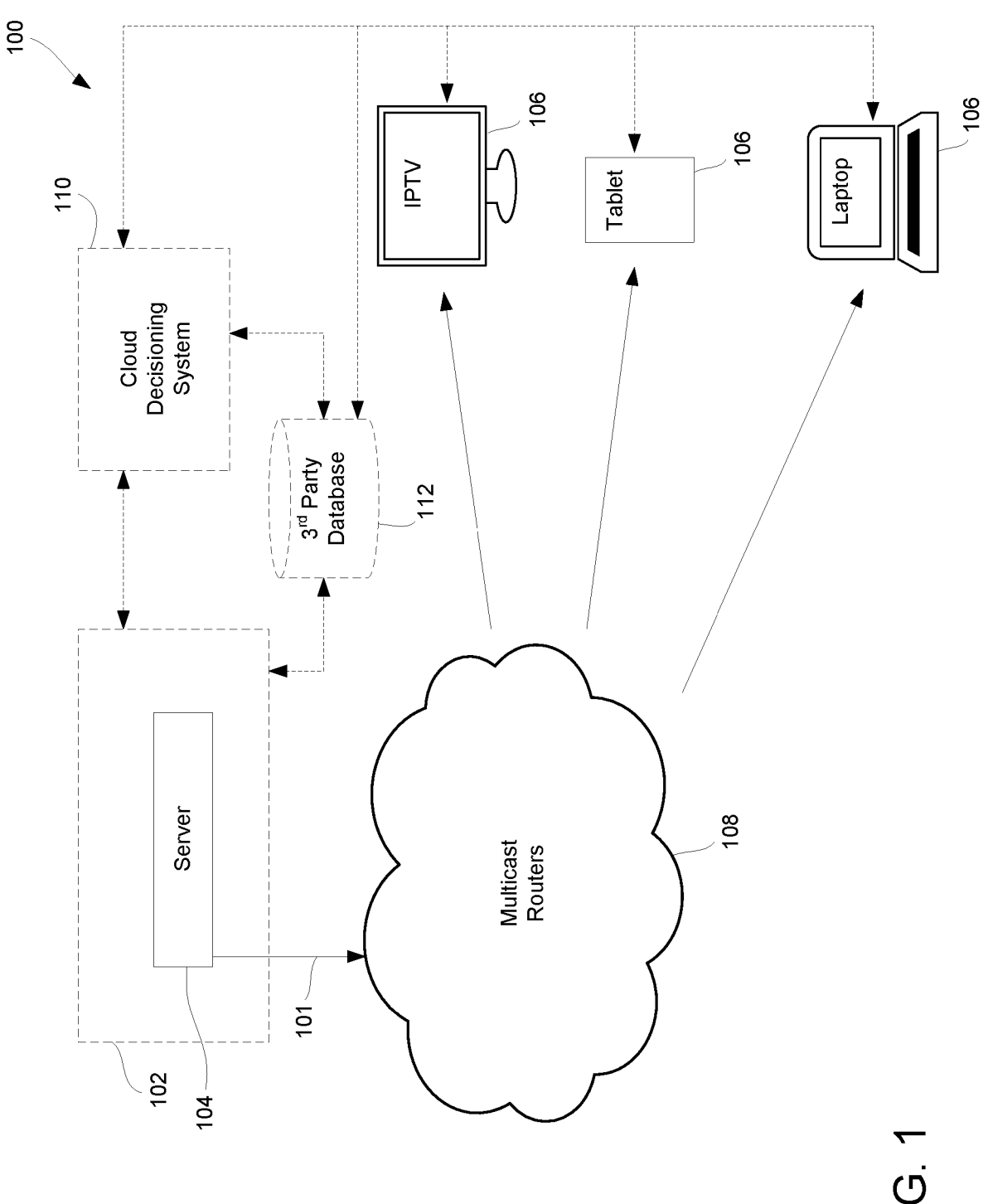
FIG. 1 is a schematic diagram of a shared stream network in accordance with the present invention.

Referring to FIG. 1, a multicast network 100 in accordance with the present invention is shown. Various point-to-multipoint transmission networks may be employed, including protocols optimized for data and/or wireless networks, for example, Multimedia Broadcast Multicast Services (MBMS), evolved Multimedia Broadcast Multicast Services (eMBMS), Long Term Evolution (LTE) broadcast, and other services. The illustrated network 100 is operative to transmit a multicast stream 101. Multiple user equipment devices 106 can connect to the platform 102 via multicast routers 108 to receive the multicast stream 101.

More specifically, the platform 102 may include one or more machines such as server 104 for creating and transmitting the stream 101. In this regard, the server 104 may be operative to access a programming source and assets as will be described in more detail below.

Various types of user equipment devices 106 may be utilized to access and render the multicast stream 101. In the illustrated embodiment, an IP enabled television, a tablet and a laptop are shown. But any other devices, including mobile telephones, that can access and render the multicast stream 101 may be utilized in accordance with the present invention. In particular, both wireless and wired devices may be employed.

As will be understood from the description below, the multicast stream 101 includes programming and assets for insertion within the programming. The assets may be any content for insertion within a defined asset delivery opportunity within the programming. In one implementation, the multicast stream 101 includes audiovisual content, e.g., television or similar live or recorded content. In this context, the assets may comprise various types of messages or advertisements including product placement, overlay ads, pop-up ads or the like. One commercially important implementation of the invention relates to providing targeted advertisements in connection with an addressable ad spot within the programming. In such cases, the stream 101 may include multiple asset options multiplexed into the stream 101 at the time of the asset delivery opportunity, e.g., the addressable spot. As will be described in more detail below, an appropriate asset is selected by or for each of the user equipment devices 106 so that different assets are delivered to different network users, e.g., based on demographics, viewing habits, interests or other classification parameters.

There are multiple ways that this asset selection can be implemented. For example, individual assets may be matched to individual users at the network platform 102 or at the user equipment devices 106. In the illustrated embodiment, individual assets are matched to individual users at a cloud-based decisioning system 110 as described in U.S. patent application Ser. No. 15/403,827 which is incorporated herein by reference in its entirety. Generally, the cloud decisioning system 110 obtains information concerning the asset options that are included in the stream 101. This information may be obtained from the platform 102 or the user equipment devices 106. For example, the user equipment devices 106 may identify the asset options and request a play decision from the cloud decisioning system 110. Alternatively, the platform 102 may notify the cloud decisioning system 110 of an upcoming asset delivery opportunity and may include an identification of the devices 106 that are receiving the stream 101 as well as the assets that are available for playing in the asset delivery opportunity. In either case, the cloud decisioning system 110 may obtain the targeting parameters for each of the assets and compare the targeting parameters to classification parameters associated with each of the devices 106. The classification parameters may pertain to a device, a household, or an individual. The classification parameters may be obtained from a variety of sources including one or more third-party databases 112. The third-party database 112 may include information concerning demographics, interests, hobbies, lifestyle, psychographics, or other information for individuals or households. For example, the third-party database 112 may be a database maintained by Experian or another party that has access to financial and transaction information. Thus, each of the devices 106 may deliver a custom asset to an associated network user or users.

In an alternative implementation, asset selections may be made at the platform 102 and the devices may be controlled by a message or series of messages. For example, the platform 102 may compile lists of devices 106 for each of multiple targeting categories, e.g., based on income, prior purchases of products, age, gender, interests, etc. Each device 106 may then be informed of its value for each of these categories, e.g., via unicast messages or broadcast lists. Consequently, each device 106 is able to determine its classification parameter based on the category values or combinations thereof, e.g., using Boolean logic. When targeting parameters (potentially including prioritization rules) for assets are subsequently provided, the devices can select assets based on the classification parameters and the targeting parameters.

Figure 2:
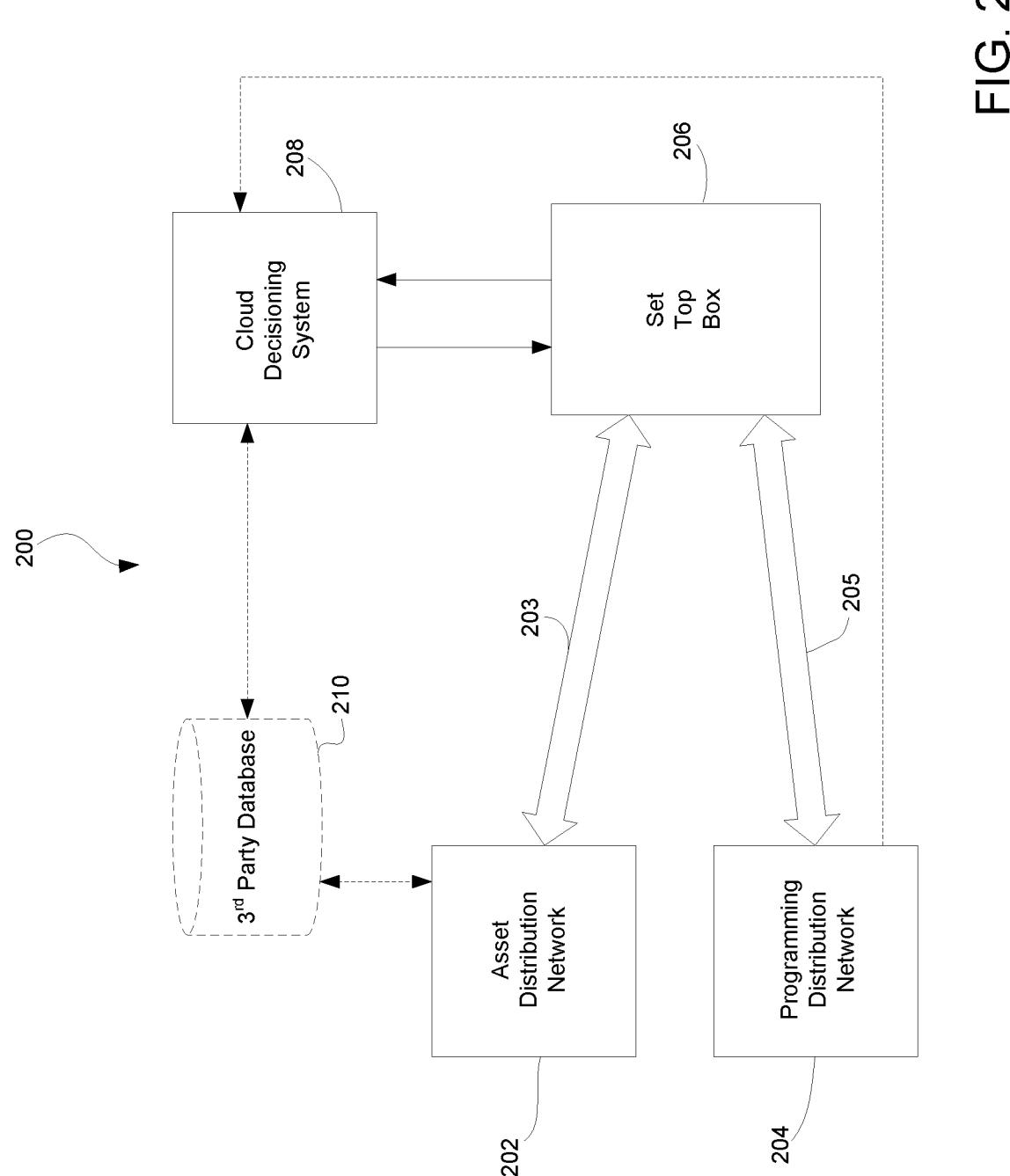
FIG. 2 is a schematic diagram of an alternative shared stream network in accordance with the present invention.

FIG. 2 shows an alternative embodiment of a multicast network 200 in accordance with the present invention. In particular, the illustrated network 200 involves providing the programming and assets via different distribution networks. For example, the programming may be provided via a cable or satellite television network whereas the assets may be provided via an IP network such as the Internet. In this context, it may be useful to provide the assets via a multicast stream so as to, among other things, reduce the bandwidth required to provide targeted assets to network users in connection with programming that may include a large audience needing to access assets at substantially the same time during an asset delivery opportunity or shortly before an asset delivery opportunity.

The illustrated network 200 includes an asset distribution network 202 and a programming distribution network 204. Each of the distribution networks 202 and 204 transmits content to a user equipment device, in this case, a set top box 206. As noted above, the programming distribution network may be, for example, a cable-television network or a satellite television network. The programming stream 205 includes asset delivery opportunities including at least one addressable asset spot. The asset distribution network 202 may be implemented in an IP network such as the Internet. Specifically, the asset distribution network transmits one or more multicast streams 203 including a number of asset options for delivery in connection with the addressable spot of the programming stream 205. Although only one set top box 206 is illustrated, it will be appreciated that multiple set top boxes may connect to the asset distribution network to receive the stream 203. The asset options of stream 203 may be synchronized or nearly synchronized with the addressable spot of the programming stream 205 or may be time stamped or otherwise indexed to the stream 205 such that the set top box 206 can store an asset, if only momentarily, prior to insertion into the programming stream 205 for delivery to a user of the set top box 206.

As described above, a cloud decisioning system 208 may match assets to individual users and direct the set top boxes concerning which asset to deliver. In this regard, the programming distribution network 204 or the set top box 206 may notify the cloud decisioning system 208 of an upcoming asset delivery opportunity and request an asset delivery decision. If the programming distribution network 204 notifies the cloud decisioning system 208 of the upcoming asset delivery opportunity, the notification may include a list of the assets available for delivery and the set top boxes 206 that have joined the multicast (if known). If the set top box 206 notifies the cloud decisioning system 208 of the upcoming asset delivery opportunity, the set top box may include its identity and a list of the available assets with the notification. In a hybrid scenario, the programming distribution network may notify the cloud decisioning system 208 of the assets that are available for the asset delivery opportunity and each set top box 206 may identify itself and request a decision for the identified asset delivery opportunity.

As described above, the cloud decisioning system obtains, from the programming distribution network 204 or another source, the targeting parameters for each of the assets and matches the targeting parameters to classification parameters associated with the set top box 206 to select an asset for delivery. In this regard, the classification parameters may use information from a variety of sources including third-party database sources 210. In an alternate implementation, a platform of the asset distribution network 202 may obtain information from the third-party database 210 and make asset selection decisions for individual set top boxes 206. The results of those asset selection decisions may be included in metadata inserted into the stream 203 to instruct set top boxes 206 as to which asset to deliver. For example, the metadata may include a list of set top boxes for each asset option.

Figure 3:
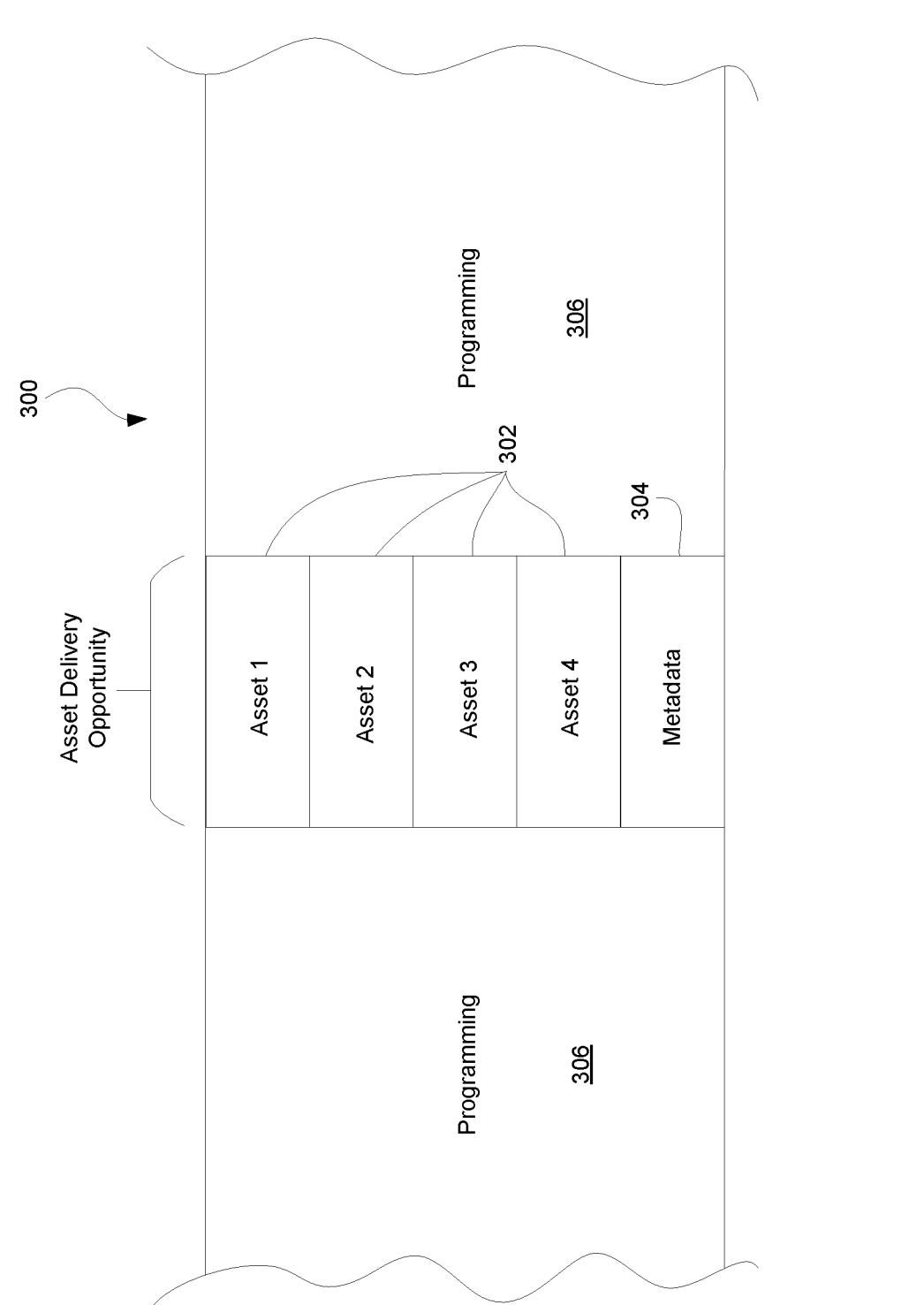
FIG. 3 is a schematic diagram of a multicast stream including multiple asset options in accordance with the present invention.

FIG. 3 shows a schematic diagram of a multicast stream 300 in accordance with the present invention. As will be understood from the description above, the programming and asset options may be provided in a single multicast stream, separate multicast streams, or a broadcast stream 40 including programming together with a multicast stream including the asset options, among other possibilities. In some cases, more than one multicast stream may be utilized for the same programming. For example, one multicast stream with programming and a first set of multiplexed assets may be designated for a first geography (or broad demographic/language group) and another multicast stream with the same programming and another set of asset options may be designated for another geography or group. Groups of users may then be controlled to select the appropriate multicast for the programming and individual users can be controlled to select the appropriate asset. For example, this may be done to allow for more asset options or to accommodate any parochial bandwidth considerations. The illustrated stream 300 includes programming 306 and assets 302 in a single stream 300. This is advantageous as it reduces or substantially eliminates timing issues associated with inserting assets from a separate multicast stream into an asset delivery opportunity of programming. On the other hand, the number of assets 302 that can be multiplexed into the multicast stream 300 may be limited due to bandwidth considerations (e.g., availability or cost). The number and identity of the assets 302 may be optimized in this regard as will be described in more detail below.

The illustrated stream 300 also includes metadata 304. Among other things, the metadata 304 may include information to assist the user equipment device in selecting one of the assets 302 for delivery. The nature of the metadata 304 may differ depending on the implementation. For example, where the user equipment device matches the targeting parameters of assets to classification parameters of the user, the metadata 304 may include information concerning targeting parameters for each of the assets 302. Where the matching is done at the multicast network platform, the metadata 304 may include a list of user equipment devices for each asset. In that case, the user equipment device can simply look itself up to determine which asset to deliver. In cases where the matching is done by a platform separate from the multicast network platform and the user equipment device, for example, by a cloud decisioning system, the metadata 304 may include an identifier for the asset delivery opportunity.

Figure 4:
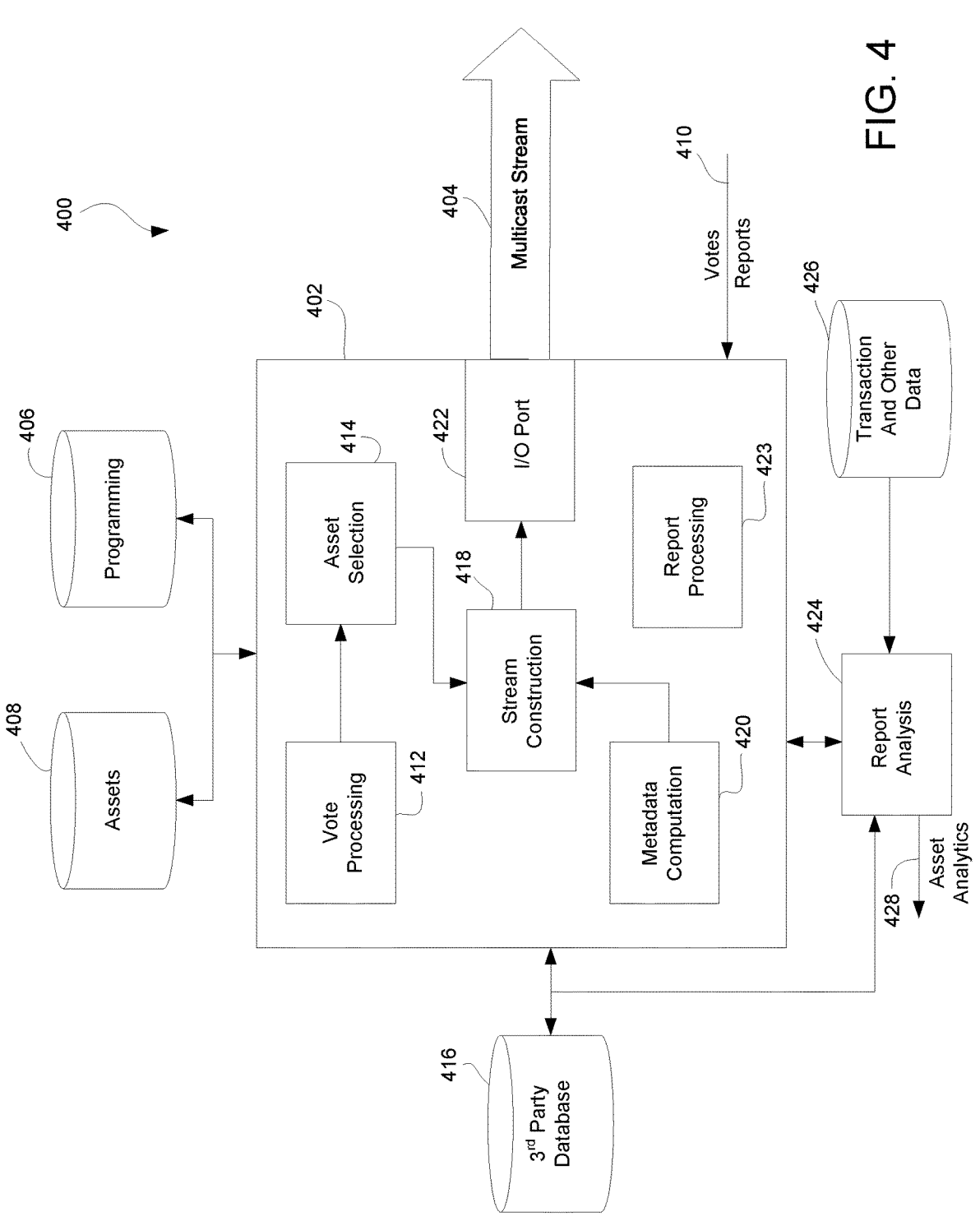
FIG. 4 is a schematic diagram of a multicast network platform in accordance with the present invention.

FIG. 4 shows a multicast network platform 400 in accordance with the present invention. The platform 400 is operative for generating and transmitting a multicast stream 404 and for receiving communications 410 from user equipment devices. Although the platform 400 is illustrated as including a server 402 associated with a number of databases and other modules, it will be appreciated that the platform 400 may be implemented as one machine or multiple machines and may be disposed at a single location or may be geographically distributed. Moreover, the functionality may be integrated in a single system or various functions may be expected by separate systems.

The illustrated platform 400 includes a server 402 that can access a source of programming 406 and a source of assets 408. The programming source 406 may vary depending on the nature of the programming. In the case of prerecorded programming, the programming source 406 may include storage such as optical storage, tape drives, solid-state storage or the like. In the case of live programming, the source 406 may be a satellite feed, a data conduit, or other live content source. The assets are typically prerecorded. Accordingly, the asset source 408 may include any suitable storage repository.

As noted above, there may be practical bandwidth constraints concerning how many asset options may be included in the multicast stream 404. Accordingly, the platform 400 may optimize the number and identity of assets included as options for a given asset delivery opportunity. Such optimization may depend on a number of factors as described in U.S. Pat. No. 7,730,509, which is incorporated herein by reference in its entirety. Some of these factors include the composition of the audience for the multicast stream 404, the pricing for the various assets, certain contract requirements related to asset delivery such as total number of impressions desired and time left in the campaign, as well as other factors. It will be appreciated that, due to the nature of multicast networks, the audience composition may not be known ahead of time. Accordingly, it may be desirable to obtain feedback or messaging from user equipment devices to better define the audience composition. Accordingly, the messages 410 from the user equipment devices may include votes submitted prior to an asset delivery opportunity, for example, a short time before the asset delivery opportunity. In this regard, the platform 400 may transmit an asset list, including a listing of all or some assets that are available for delivery in connection with an asset delivery opportunity, to all or a sampling of the user equipment devices. In response, some or all of the user equipment devices may vote for one or more assets that are deemed appropriate (or not) for the user equipment device. This may be based on a comparison, at the user equipment device, of the targeting parameters of the assets to classification parameters associated with the user equipment device. The classification information may be obtained at the user equipment device from a cloud decisioning system as described above or from a classifier running on the user equipment device as described in U.S. Pat. No. 9,693,086.

The illustrated server 402 includes a vote processing module 412. The module 412 receives the votes and provides audience composition information, based on the votes, to asset selection module 414. The asset selection module 414 uses the audience composition information together with other information such as contract information and asset pricing information to select assets for inclusion in the multicast stream 404. Although a single multicast stream is shown, as described above, multiple multicast streams including the same programming and different asset options may be utilized with appropriate modification of the functionality/components shown in FIG. 4. In this regard, the asset selection module 414 may determine a number of assets to be included for a given asset delivery opportunity and which assets to include. In many cases, the assets may be selected so as to maximize revenues that are expected to be realized in connection with asset delivery for that asset delivery opportunity. Information concerning the assets for the asset delivery opportunity are provided to the stream construction module 418.

The stream construction module 418 also obtains metadata from the metadata computation module 420. As described above, the multicast stream 44 may include metadata for use by the user equipment device in selecting one or more of the assets for delivery in connection with an asset delivery opportunity. The nature of the metadata depends on the particular implementation and may include targeting parameters for assets, a list of user equipment devices for each asset, or other information. The stream construction module 418 then uses the asset selection information to access the programming source 406 and the asset source 408 to obtain the content for the multicast stream 404. The module 418 also combines the metadata with this content. The content is provided to an I/O port that is operative to transmit the multicast stream 404. Among other things, the port 422 may format the content for multicast transmission and insert that content into the stream 404.

It is useful to obtain accurate information concerning what assets were delivered and how many, and which, audience members received each asset. This information may be used to bill asset providers as well as to analyze asset effectiveness. In the latter regard, it is also useful to know whether users fully consumed and were interested in the assets. Such information may be determined based on reports from the user equipment devices as described in U.S. Pat. No. 9,712,788. Such reports may be included in the messages 410. The reports are received from all or a sampling of the user equipment devices and may be aggregated and otherwise processed by the report processing module 423. For example, the report processing module 423 may determine the audience size and composition for each asset as well as any indications that the assets were not fully consumed or that the audience was or was not fully engaged or interested in the assets. This information may be provided to a report analysis system 424 that provides asset analytics 428. For example, the asset analytics may provide various measures of asset effectiveness with respect to the target audience. In this regard, the report analysis system 424 may obtain transaction and other data 426 from other sources. For example, the transaction data may indicate that some users purchased products of interest after viewing a given asset or made inquiries or visited websites of interest after viewing the asset.

Figure 5:
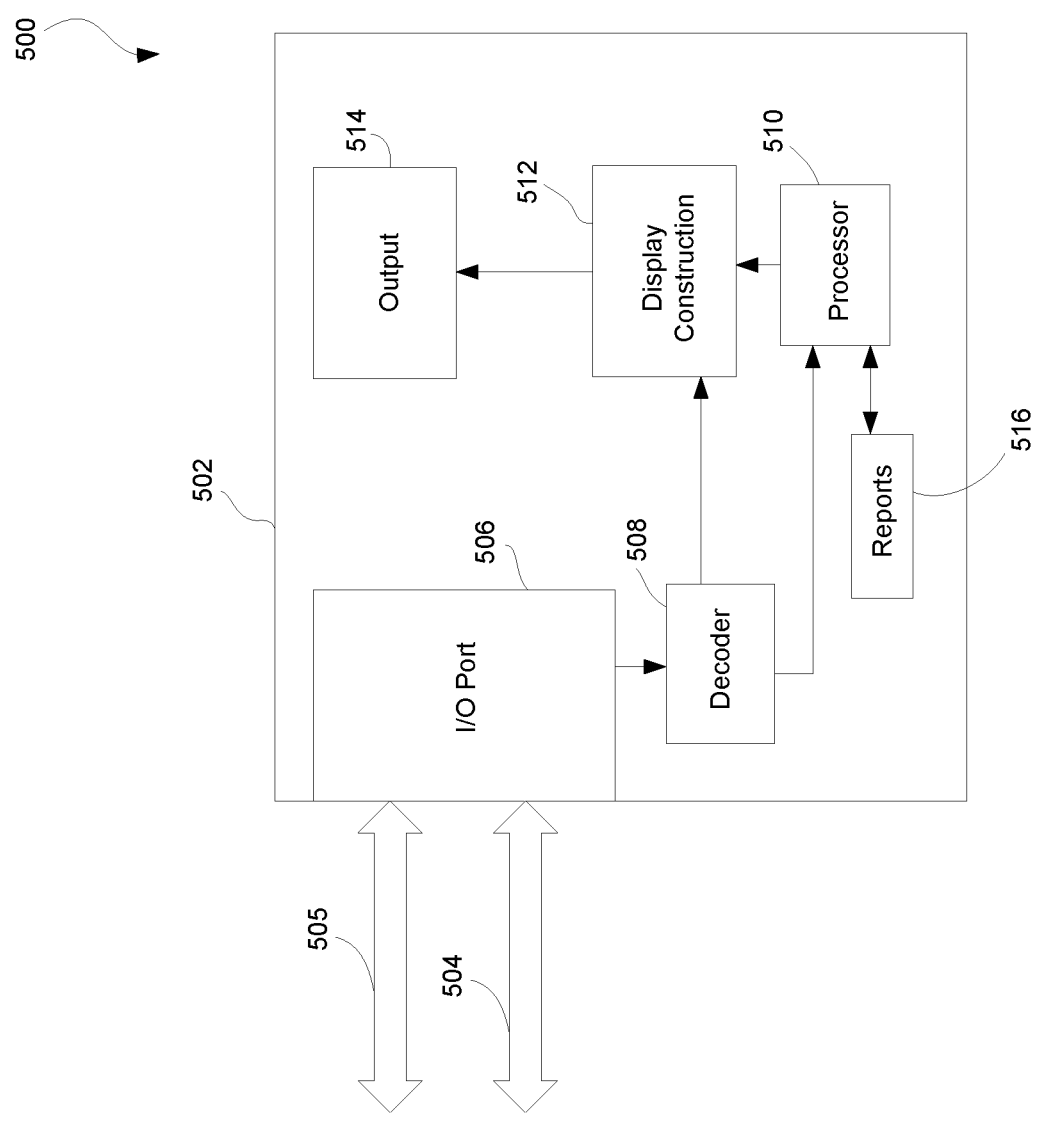
FIG. 5 is a schematic diagram of a user equipment device in accordance with the present invention.

FIG. 5 illustrates a user equipment device 500 in accordance with the present invention. For example, the device 500 may be embodied in an IP enabled television, a tablet computer, a laptop computer, a mobile phone, or other device for receiving and rendering a multicast stream 504. The device may also communicate (505) with another platform, such as a cloud decisioning system as described above, e.g., to request asset play decisions and receive responses. The illustrated device 500 includes an IPTV 502 having an I/O port 506 for receiving the multicast stream 504. In the illustrated embodiment, the multicast stream 504 includes programming and a number of asset options for delivery in connection with an asset delivery opportunity of the programming. The port 506 may include an RF antenna, a cable port, an ethernet port, or the like and associated circuitry and logic. The port 506 provides an output including the content of the stream 504 to decoder 508. The decoder 508 decodes the stream and extracts the content of the programming, the asset options and the metadata. The metadata is provided to a processor 510 that also receives selection information for use in selecting an asset for the asset delivery opportunity. As described above, the selection information may be provided by a cloud decisioning system or other system that provides classification information associated with the device 500 or a selection decision. Based on the metadata and any selection information, the processor 510 selects one of the assets for delivery in connection with the asset delivery opportunity.

The decoder 508 also provides the programming content and at least the selected asset to a display construction module 512. The display construction module 512 inserts the selected asset into the programming at the asset delivery opportunity and provides an output to a output 514 of the device 500. In this regard, the module 512 may, among other things, format the programming and asset to be suitable for the output 514. In the illustrated embodiment, the output 514 encompasses the display and speakers of the IPTV 512. The processor 510 also provides information regarding the selected asset to the report module 516. The report module 516 provides report information to a multicast network platform or other platform for processing the reports, e.g., for billing or analysis purposes. The report module 516 may collect other information indicating a consumption status and indication of interest related to the asset. For example, the module 516 may monitor and report whether the asset was fully consumed or if the user tuned away from the asset during delivery. Similarly, the module 516 may monitor and report whether the volume was muted or reduced during delivery. Other indications of interest, such as inputs explicitly indicating interest or lack thereof, or indications of presence, may be monitored and reported. The device may also include logic for enforcing asset consumption rules such as preventing tune-aways, preventing muting or, in time shifted contexts (e.g., VOD) preventing asset skipping.

Figure 6:
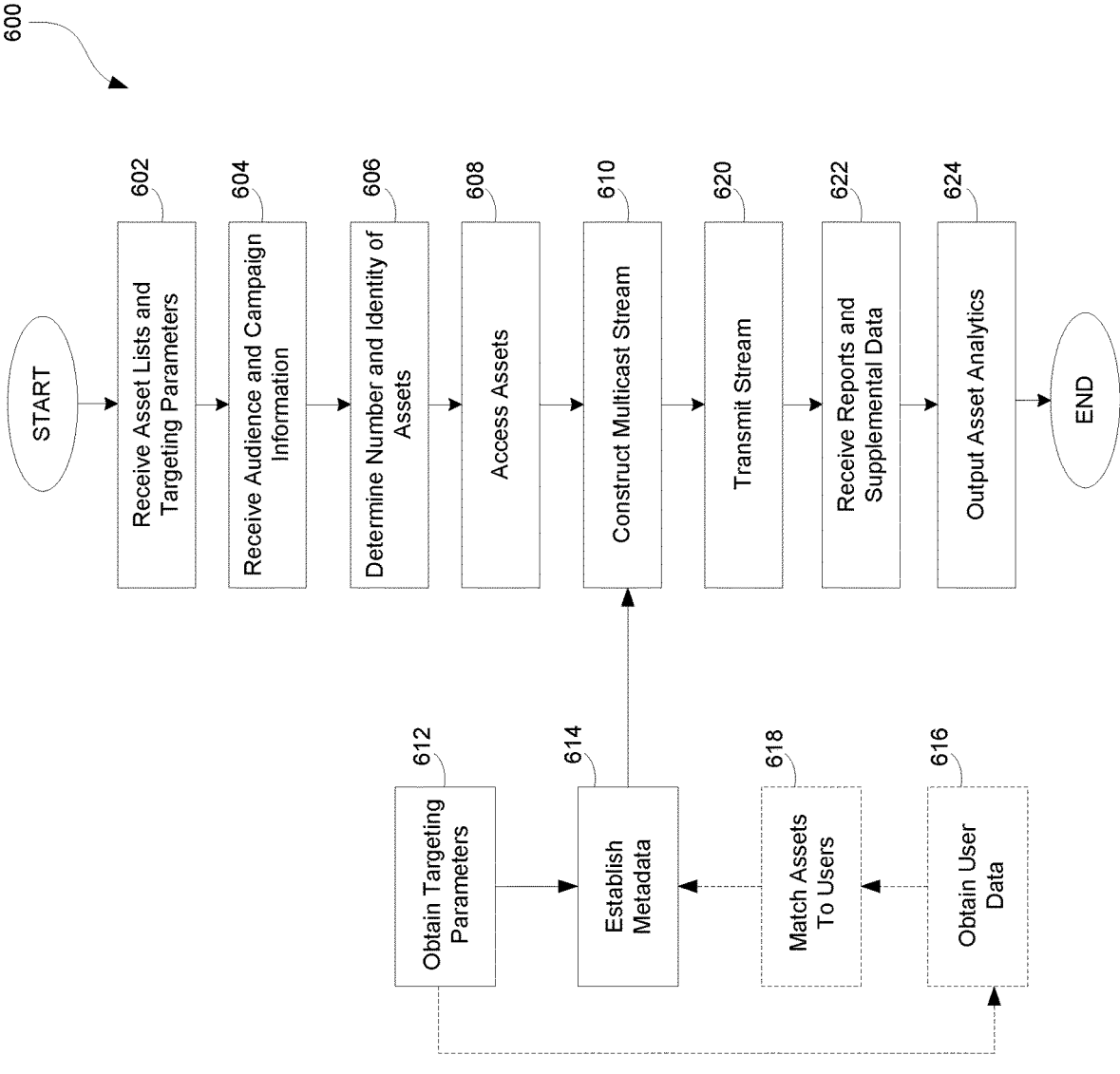
FIG. 6 is a flowchart illustrating network platform functionality in accordance with the present invention.

FIG. 6 is a flowchart illustrating a multicast network platform process 600 in accordance with the present invention. The process 600 is initiated by receiving (602) asset lists and targeting parameters. The asset lists may include all assets or a number of assets from an asset source that are available for delivery in connection with a given asset delivery opportunity. The targeting parameters for each asset may also be obtained from the asset source or from another source.

The illustrated method 600 further involves receiving (604) audience information and campaign information. For example, the audience information may include information regarding the size and composition of the expected audience of the multicast stream. This may be based on voting as described above or may be estimated based on the subject matter of the programming and historical programming information. The campaign information may include pricing information for asset delivery, constraints on asset delivery, and information regarding the desired number of impressions for particular assets and the time remaining in a campaign, among other things.

Based on all of this information, a processor may determine (606) the number and identity of assets to be included as asset options for an asset delivery opportunity in the multicast stream. For example, there may be a limit to how many asset options may be included based on available bandwidth or bandwidth costs. This may determine or influence the number of assets. The information concerning the audience size and composition as well as campaign information may be used to select which assets to include in the multicast stream, for example, to maximize revenues or otherwise optimize asset delivery.

Once the number and identity of assets has been determined, the selected assets may be accessed (608) and used to construct (610) the multicast stream. In particular, the selected assets may be multiplexed into the asset delivery opportunity of a programming stream.

The multicast stream may also include metadata. As discussed above, in some cases, the metadata will include targeting parameters for the assets. In this regard, the system may obtain (612) the targeting parameters for the selected assets and use those parameters to establish (614) metadata. In other cases, the metadata may include a list of user equipment devices for each asset. In this case, the system may obtain (616) user data, such as classification parameters, and match (618) particular devices to particular assets based on the targeting parameters and the classification parameters. In any event, the system establishes (614) metadata and provides the metadata for use in constructing (610) the multicast stream. The stream is then transmitted (620) so that it can be accessed by any user equipment devices that have joined the multicast stream.

As noted above, user equipment devices may generate reports concerning the delivery of assets. Accordingly, the illustrated process 600 involves receiving (622) reports in supplemental data. The supplemental data may include information regarding subsequent activities of users such as purchasing products of interest, visiting websites of interest, or otherwise reacting to the assets. This information may be analyzed to generate information for billing and asset effectiveness. Such information may be output (624) in the form of asset analytics or billing information.

Figure 7:
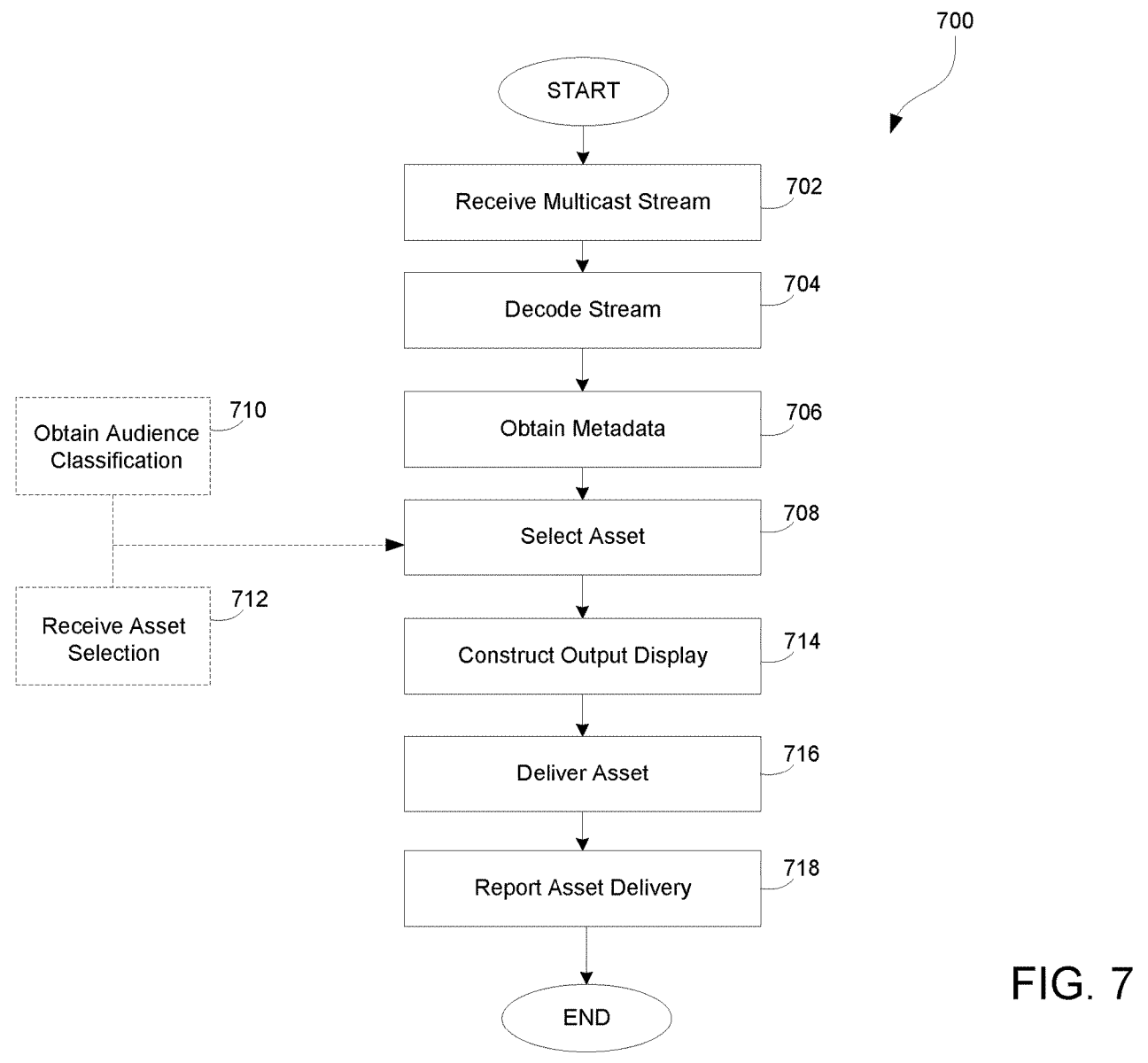

FIG. 7 illustrates a user equipment device process 700 in accordance with the present invention. The process 700 is initiated by receiving (702) a multicast stream. As discussed above, the multicast stream may include programming, a number of asset options provided in connection with an asset delivery opportunity in the programming, and metadata for use in selecting one or more of the assets for delivery in connection with an asset delivery opportunity.

The user equipment device then decodes (704) the stream and obtains (706) the metadata. The metadata may be used in conjunction with other information to select an asset. The nature of this process depends on the specific implementation. In cases where the user equipment device performs the matching process, audience classification parameters for the user equipment device may be obtained (710). The audience classification parameters can then be compared to targeting parameters included in the metadata to the asset. In other cases, the matching process may be performed at a location separate from the user equipment device, such as a multicast network platform or independent cloud decisioning system. In such cases, the user equipment device may receive (712) the asset selection either as part of the metadata, e.g., a list embedded in the metadata, or from a separate location.

In any case, the user equipment device selects (708) and asset from the asset options and constructs (714) an output display. Such construction involves inserting the selected asset into the programming stream and formatting the stream for display. The asset is then delivered (716) by displaying and otherwise rendering the asset to an end-user. The user equipment device may then report (718) asset delivery and any information regarding consumption and interest. This information may be reported to a multicast network platform or other report processing platform.

The foregoing description of the present invention has been presented for the purpose of illustration and description. Furthermore, the description is not intended to limit the invention to the form disclosed herein. Consequently, variations and modifications commensurate with the above teachings, and skill and knowledge of the relevant art are within the scope of the present invention. The embodiments described herein above are further intended to explain best modes known of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The invention claimed is:

1. A method for use in delivering targeted assets in a shared stream network environment comprising:

operating a network structure of one or more network platforms to establish a first multicast stream wherein multiple end user devices can simultaneously receive the first multicast stream;

first inserting, into said first multicast stream, first programming content having a first asset delivery opportunity associated with a time window of said first programming content; and second inserting, into a second multicast stream, the same as or different from said first multicast stream, a set of at least two assets available for delivery in said first asset delivery opportunity of said first programming content together with asset metadata for use by end user devices in selecting one of said set of at least two assets for delivery;

wherein said end user devices are configured to:

use the asset metadata to select one asset of said set of at least two assets for delivery in said first asset delivery opportunity of said first programming content such that said end user devices receive targeted assets via multicast in connection with shared stream programming, wherein said metadata comprises one or more of:

a list of user equipment devices corresponding to one of said set of at least two assets; and targeting parameters corresponding to one of said set of at least two assets;

play the first programming content; and play the selected one asset of said set of at least two assets in the associated time window.

2. The method as set forth in claim 1, wherein said first multicast stream comprises a single multicast data transmission stream and said set of at least two assets is included together with said first programming content in said first multicast stream.

3. The method as set forth in claim 1, wherein each asset of said set of at least two assets is associated with said time window of said first asset delivery opportunity.

4. The method as set forth in claim 1, wherein each asset of said set of at least two assets is inserted into said first multicast stream in synchronization with said time window of said first asset delivery opportunity.

5. The method as set forth in claim 1, further comprising determining a number of assets to be included in said set and selecting said number of assets based on an expected composition of an audience of said first multicast stream.

6. The method as set forth in claim 5, wherein said expected composition is based on messaging between data network structure and at least some of said end user devices.

7. The method as set forth in claim 5, wherein said expected composition is based on votes submitted by at least some of said end user devices with respect to said set of at least two assets.

8. The method as set forth in claim 1, further comprising receiving, from at least some of said end user devices, reports indicating assets delivered in connection with said first asset delivery opportunity.

9. The method as set forth in claim 1, wherein said selecting is based on a comparison of targeting parameters of said assets with classification parameters associated with each one of said end user devices.

10. The method as set forth in claim 9, wherein said comparison is performed at data network structure.

11. The method as set forth in claim 9, wherein said comparison is performed at each of said end user devices.

* * * * *